(12) United States Patent  
Malipatil et al.

(10) Patent No.: US 9,172,526 B1
(45) Date of Patent: Oct. 27, 2015

(54) IQ-SKEW ADAPTATION FOR A SYMMETRIC EYE IN A SERDES RECEIVER

(71) Applicant: LSI Corporation, San Jose, CA (US)

(72) Inventors: Amaresh Malipatil, San Jose, CA (US); Sunil Srinivasa, San Jose, CA (US); Vladimir Sindalovsky, Warrington, PA (US); Mark Trafford, Fleetwood, PA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/340,517

(22) Filed: Jul. 24, 2014

(51) Int. Cl.
*H04L 7/04* (2006.01)
*H04L 7/033* (2006.01)
*G06F 1/10* (2006.01)

(52) U.S. Cl.
CPC .. *H04L 7/04* (2013.01); *G06F 1/10* (2013.01); *H04L 7/033* (2013.01)

(58) Field of Classification Search
CPC ...... G01R 31/31937; G06F 1/10; H04L 7/033
See application file for complete search history.

(56) References Cited

U.S. PATENT DOCUMENTS

| | | | |
|---|---|---|---|
| 2003/0179027 A1* | 9/2003 | Kizer et al. | 327/158 |
| 2012/0173914 A1* | 7/2012 | Mobin | 713/401 |
| 2012/0257652 A1* | 10/2012 | Malipatil et al. | 375/219 |

* cited by examiner

*Primary Examiner* — Leon-Viet Nguyen
(74) *Attorney, Agent, or Firm* — Sheridan Ross P.C.

(57) ABSTRACT

Described embodiments provide for, in a receiver circuit, an adaptation process that adjusts the IQ-skew automatically to obtain proper eye centering in a data eye, thereby maximizing horizontal margin of the eye. The IQ-skew adaptation algorithm is realized with a 'biased' bang-bang phase detector (BBPD) oof a clock and data recovery circuit (CDR) that biases the weights applied to UP and DOWN outputs of the phase detector, rather than treating them equally. By weighting the BBPD UPs and DOWNs differently, the system locks to the left and right inner corners, and thereby is able to locate the center of the inner eye.

20 Claims, 5 Drawing Sheets

IQ-SKEW ADAPTATION FOR A SYMMETRIC EYE IN A SERDES RECEIVER

BACKGROUND

In many data communication applications, Serializer and De-serializer (SerDes) devices facilitate the transmission between two points of parallel data across a serial link. Data at one point is converted from parallel data to serial data and transmitted through a communications channel to the second point where it received and converted from serial data to parallel data.

At high data rates, frequency-dependent signal loss from the communications channel (e.g., the signal path between the two end points of a serial link) as well as signal dispersion and distortion can occur. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal. Equalization through use of one or more equalizers compensates for the signal degradation to improve communication quality.

In many data communication applications generating one or more different source clock signals, a clock and data recovery circuit (CDR) is employed to recover an input data clock signal, and generate clock signals having a known phase alignment. For example, SerDes devices that facilitate the transmission between two points of parallel data across a serial link often must generate multiple clock signals to support various standards. Bang-bang Phase Detectors (BBPD) are employed in applications that require detection and phase alignment of these different clock domain sources.

An eye pattern, also known as an eye diagram (or "eye"), represents a digital data signal from a receiver that is repetitively sampled and applied to the vertical input (axis), while the horizontal input (axis) represents time as a function of the data rate. The eye diagram allows for evaluation of the combined effects of channel noise and inter-symbol interference on the performance of a baseband pulse-transmission system, and the input data eye is the synchronized superposition of all possible realizations of the signal of interest viewed within a particular signaling interval (referred to generally as the data eye), which for convenience might be referred to generally as a unit interval or "UI". A data slicer (i.e., a Data Latch) in a SerDes device is used for digitizing an analog signal in the serial data receiver. Precision of the latch threshold has substantial impact on performance (e.g., error rate, jitter tolerance) of the SerDes device.

A bang-bang, or Alexander-type, phase detector is the most commonly used phase detector in SerDes receivers for clock and data recovery. In a decision feedback equalization (DFE)-based receiver often employed in a mixed-signal SerDes device, the required separation between the data sample (I) and the transition sample (Q) to get proper eye centering (and hence maximum horizontal margin) might be different from the nominal value (e.g., 0.5 T, where T is the transition period (also the sampling period for the data slicer). This asymmetry in the sampled eye leads to loss of horizontal margin in the eye and, hence, degraded bit error rate (BER) performance.

The classical bang-bang phase detector settles to the transition sampling point, but the DFE output inner eye is typically not fully centered, leading to a loss in horizontal margin and a degraded BER performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a skew offset in a clock and data recovery (CDR) device is generated by generating a data eye from an input signal to the decision device, the input signal including a sequence of data symbols. For each corner of a rectangle framing a center of the data eye: a roaming latch is initialized to the corner of the data eye, the roaming latch is allowed to settle to the phase position of the corner, and the vertical and horizontal positions of the settled phase are recorded. The phase position of a center of the rectangle is determined, wherein the phase position represents a vertical and horizontal phase position of the center of the data eye. A difference between the center phase position and a current data sampling phase is determined, the difference related to the skew offset; and the current data sampling phase is adjusted based on the skew offset.

BRIEF DESCRIPTION OF THE DRAWINGS

Other aspects, features, and advantages will become more fully apparent from the following detailed description, the appended claims, and the accompanying drawings in which like reference numerals identify similar or identical elements.

DETAILED DESCRIPTION

In accordance with the described embodiments, an adaptation process adjusts the IQ-skew automatically to obtain proper eye centering in a data eye, thereby maximizing horizontal margin of the eye. The IQ-skew adaptation algorithm is realized with a 'biased' bang-bang phase detector (BBPD) of a clock and data recovery circuit (CDR) that biases the weights applied to UP and DOWN outputs of the phase detector, rather than treating them equally. By weighting the BBPD UPs and DOWNs differently, the system locks to the left and right inner corners, and thereby is able to locate the center of the inner eye. An adaptation algorithm that adjusts the IQ-skew maximizes horizontal eye opening, thereby improving the robustness of the receiver.

Figure 1:
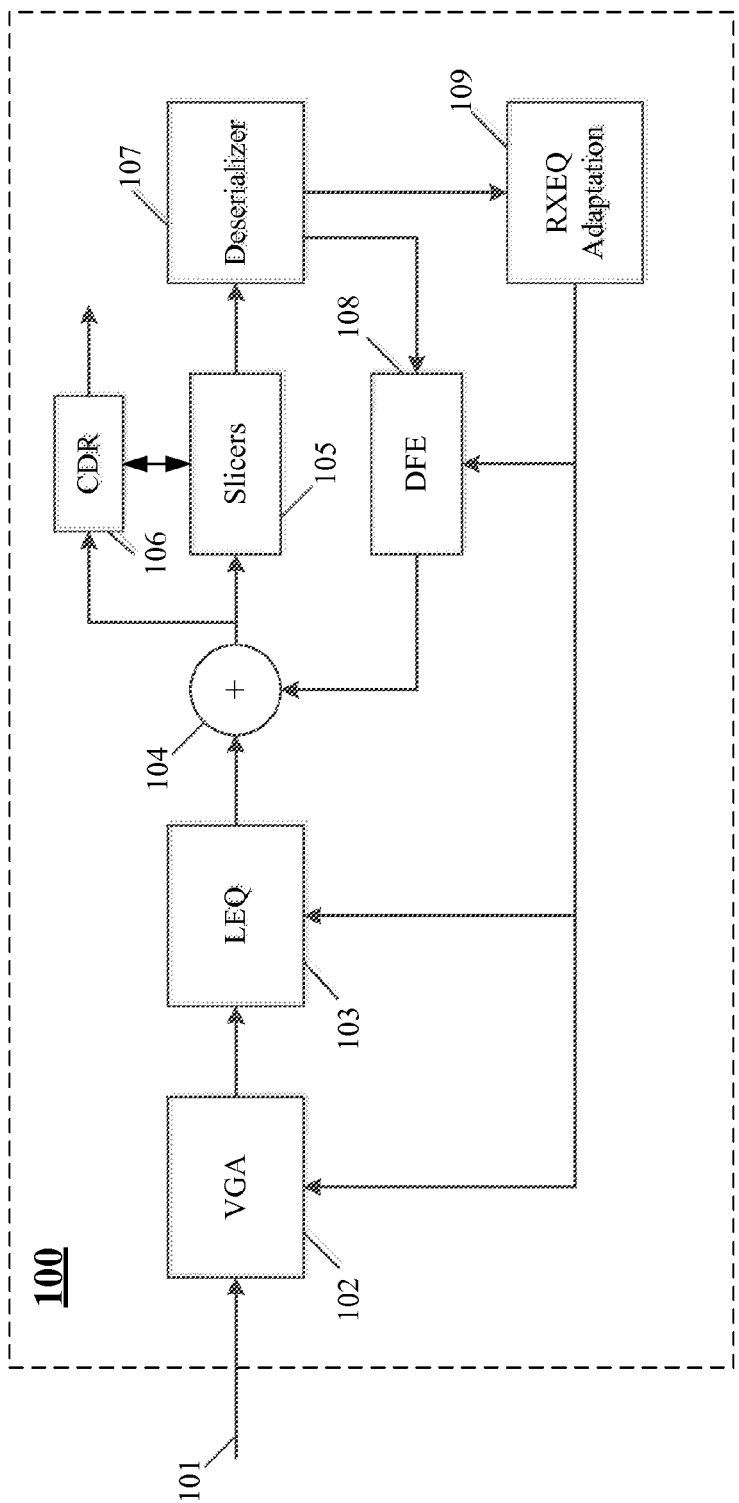
FIG. 1 shows a block diagram of a Serializer-Deserializer (SerDes) receiver employing one or more exemplary embodiments.

FIG. 1 shows an exemplary serializer-deserializer (SerDes) receiver 100 employing an exemplary embodiment. SerDes receiver 100 includes input amplifier (e.g., variable gain amplifier or VGA) 102, linear equalizer (e.g., analog linear equalizer or LEQ) 103, combiner 104, and slicers (e.g., latches) 105. Slicers 105 comprises one or more decision devices providing decisions for input data, and generates a reconstructed serial data stream. Clock and data recovery (CDR) 106 is coupled to slicers 105, and also receives the input to slicers 105. CDR 106 recovers an input data clock signal, and generates clock signals having a known phase alignment. CDR 106 comprises a phase detector (e.g., a BBPD) and associated logic controller to detect a center of a data eye and adjust transition and data sampling clocks. Output clock signals from CDR 106 might be employed to time sampling of latches placed within a data eye output from combiner 104. SerDes receiver 100 further includes deserializer 107, decision feedback equalizer (DFE) 108, and receiver equalizer coefficient adaptation circuitry (RXEQ adaptation) 109.

The serial input data from a channel, degraded after transmission through the channel, passes through amplification for enhancement in VGA 102, and then is further enhanced in LEQ 103 to compensate for potential low pass filtering characteristics of the channel. From LEQ 103, the data is sent to a summing node for additional enhancement using output from DFE 108. Slicers 105 provide decisions for input data, and generates the reconstructed serial data stream. Deserializer 107 deserializes the data for output, as well as for input decisions for DFE 108, which decision feedback equalization techniques are well known to those skilled in the art. All of the enhancement parameters are adapted through filter and coefficient adaptation processes of REXQ adaptation 109 in order to achieve maximum horizontal and vertical eye opening seen at (input to) slicers 105, which leads to a low error rate. Hence the accuracy of the latches of slicers 105 (data, transition and error for LMS adaptation algorithm) is important for achieving low SerDes error rates.

Slicers 105 represent one or more decision devices for a input data. As known in the art, the term "slicer" and "latch" are often used interchangeably for a decision device, which compares an input value to a threshold to generate an output decision based on a clock signal, and this clock signal (from a CDR) might be a sampling signal. Sampling is employed to detect transitions within the data eye as well as horizontal and vertical bounds, errors, and margins.

The IQ-skew adaptation algorithm is realized with a 'biased' bang-bang phase detector (BBPD) within CDR 106 that biases the weights applied to UP and DOWN outputs of the BBPD phase detector, rather than treating them equally. By weighting the BBPD UP and DOWN outputs differently, the system locks to the left and right inner corners at a given BER, and thereby is able to locate the center of the inner eye. In preferred embodiments, the biased BBPD might be within a CDR operating independently from a main CDR; so as not to affect the main CDR operation for data sampling, equalization, deserialization, and adaptation of parameters (e.g., by REXQ adaptation 109).

Figure 2B:
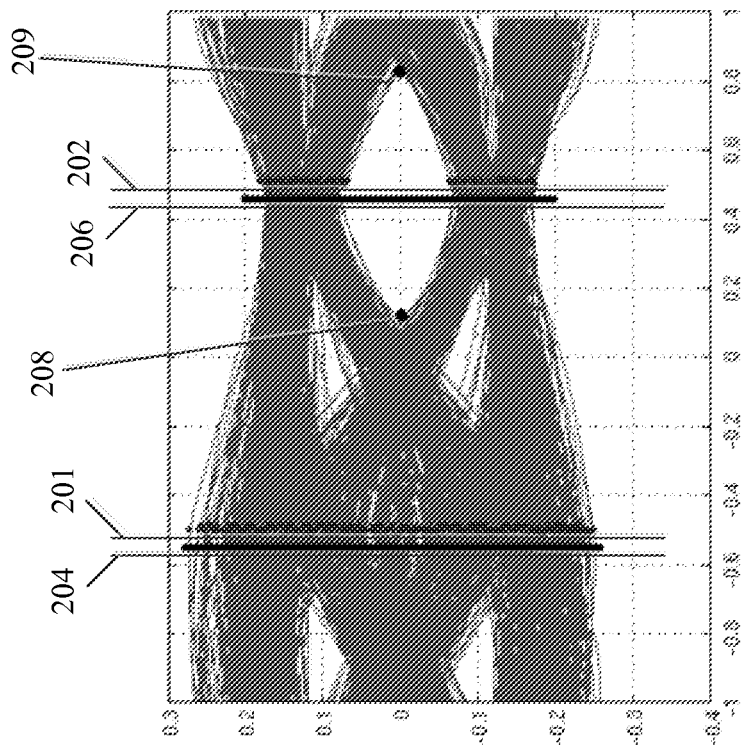
FIG. 2B shows a bang-bang or Alexander-type phase detector employing an IQ-skew adaptation algorithm in accordance with exemplary embodiments settling to shifted transition sampling points.
Figure 2A:
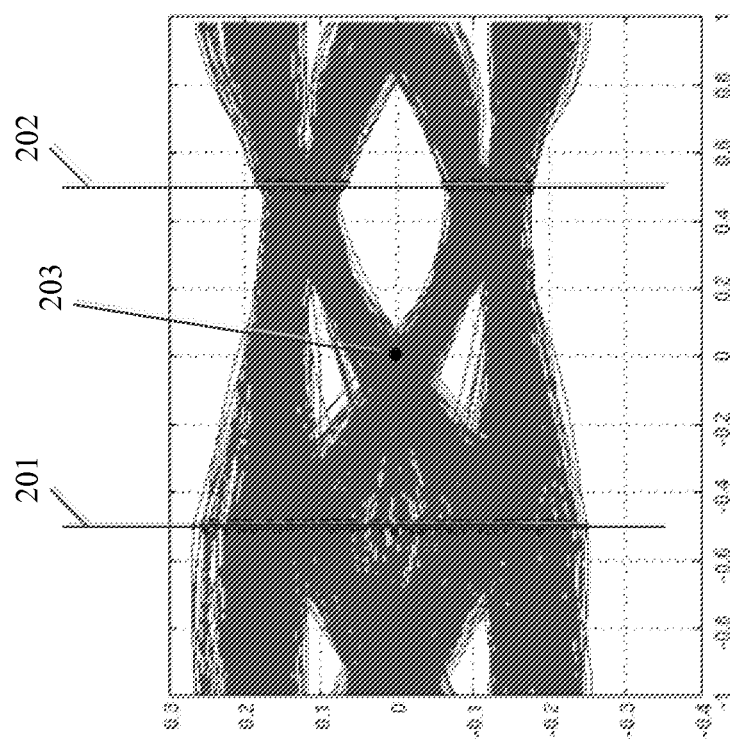
FIG. 2A illustrates a classical bang-bang or Alexander-type phase detector settling to transition sampling points.

As shown in FIG. 2A, the classical bang-bang or Alexander-type phase detector settles to the transition sampling point, but however, the DFE output inner eye is typically not fully centered. the transition sampling point 203, indicated by the black dot, and is advanced 0.5 T to the data sampling point 202, but the data sampling points (marked by the lines 201 and 202) is not in the center the DFE output eye (i.e., the data is not sampled at a point with the best horizontal and vertical margins). As shown in FIG. 2B, using a biased algorithm for the bang-bang detector allows the system lock to the left and right inner eye corners 208 and 209 (indicted by the two black dots), and enables sampling the eye at its center 206 (the black lines 204 and 206 indicate shifted sampling points). An IQ-skew adaptation algorithm in accordance with disclosed embodiments adjusts the IQ-skew automatically to obtain proper eye centering and thereby maximizing the horizontal margin. Since the IQ-skew adaptation algorithm might operate independently from a main CDR, a roaming latch is employed for detecting edges of the eye. Furthermore, given a 2 T architecture, two roaming latches, one each for the odd and even eyes, might be employed.

Figure 3:
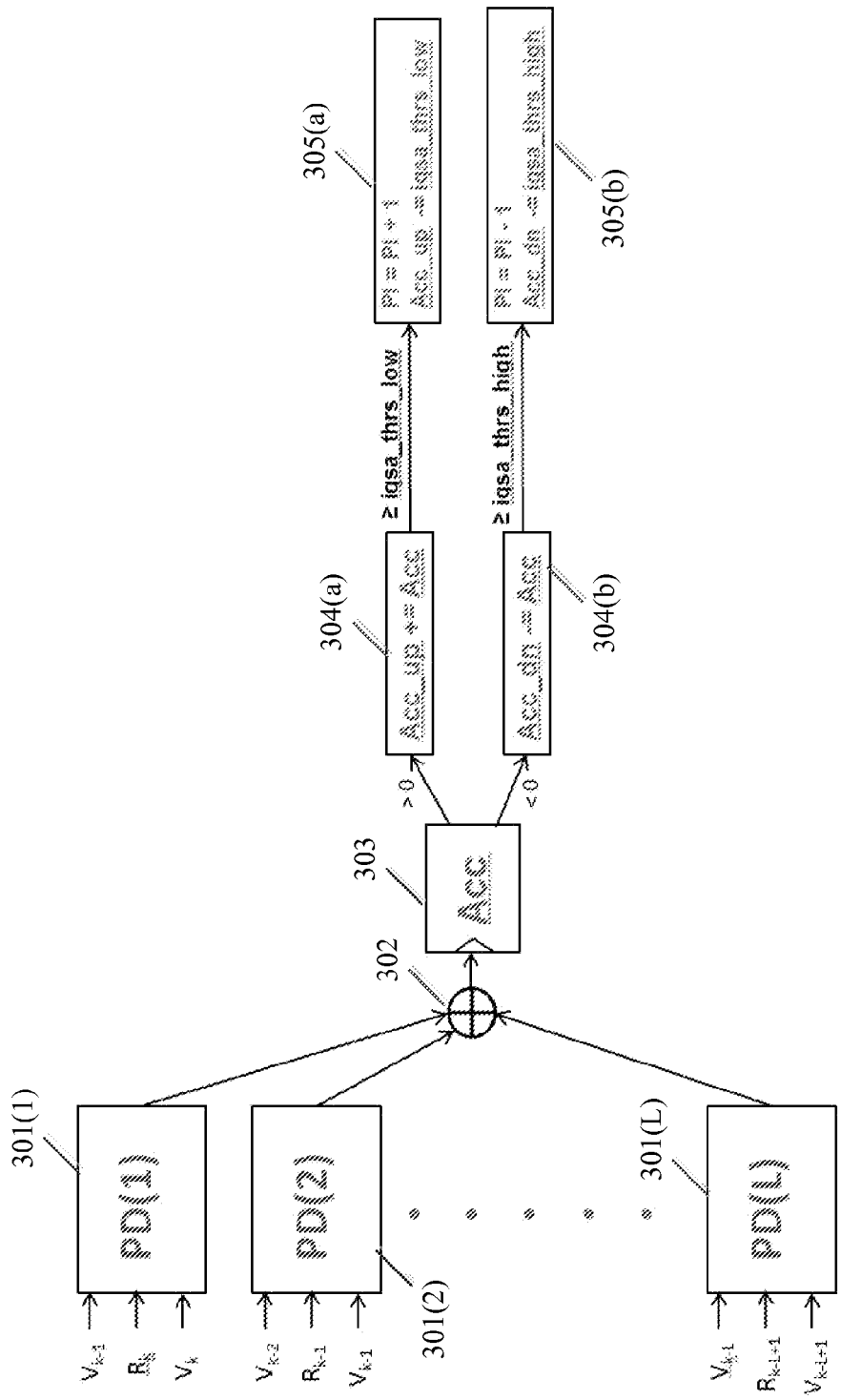
FIG. 3 shows a block diagram for data accumulation for an exemplary IQ adaptation algorithm for adaptation of a left inner eye corner.
Figure 4:
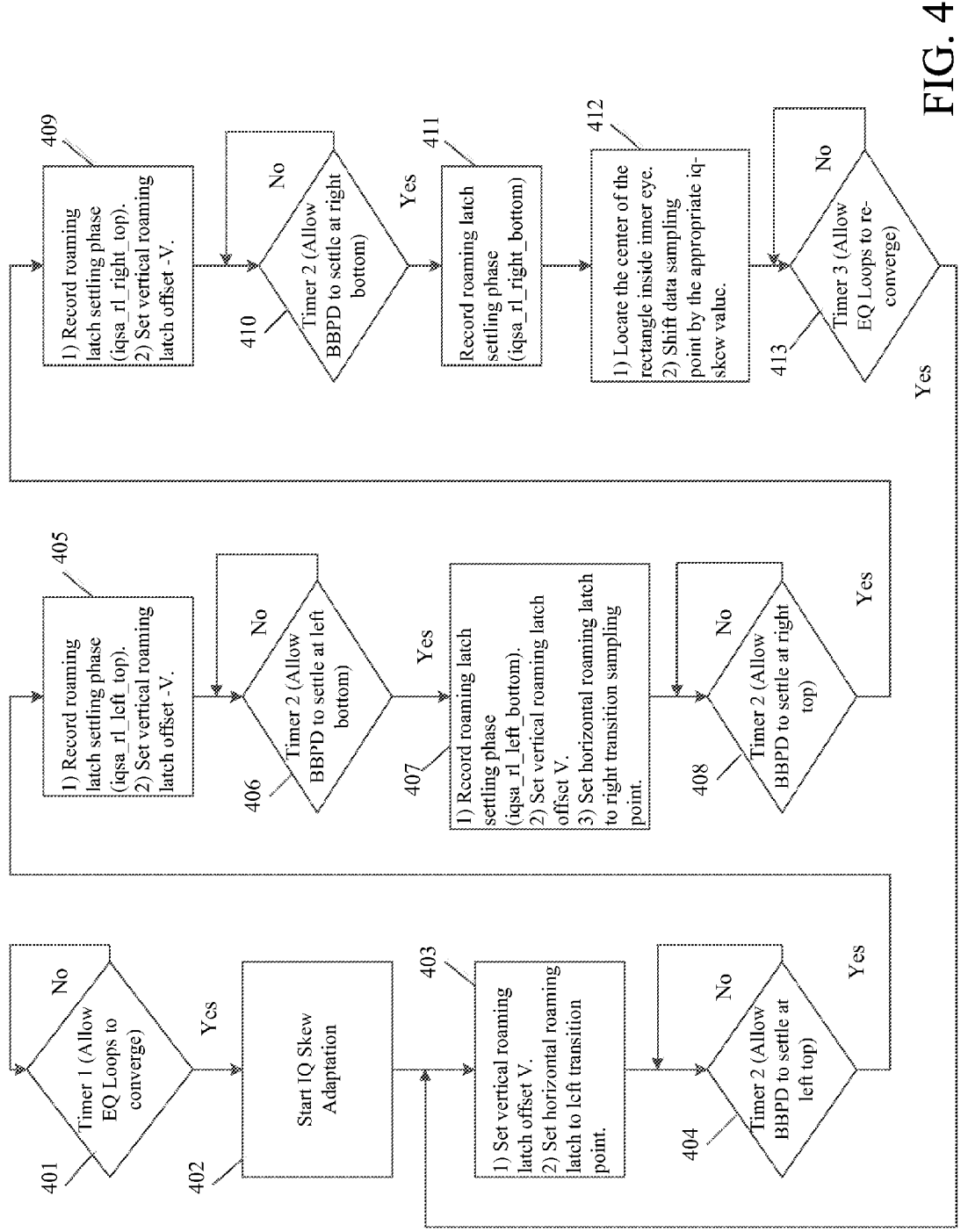
FIG. 4 illustrates a process as might be employed by a state machine implementing an exemplary IQ-skew adaptation algorithm.
Figure 5:
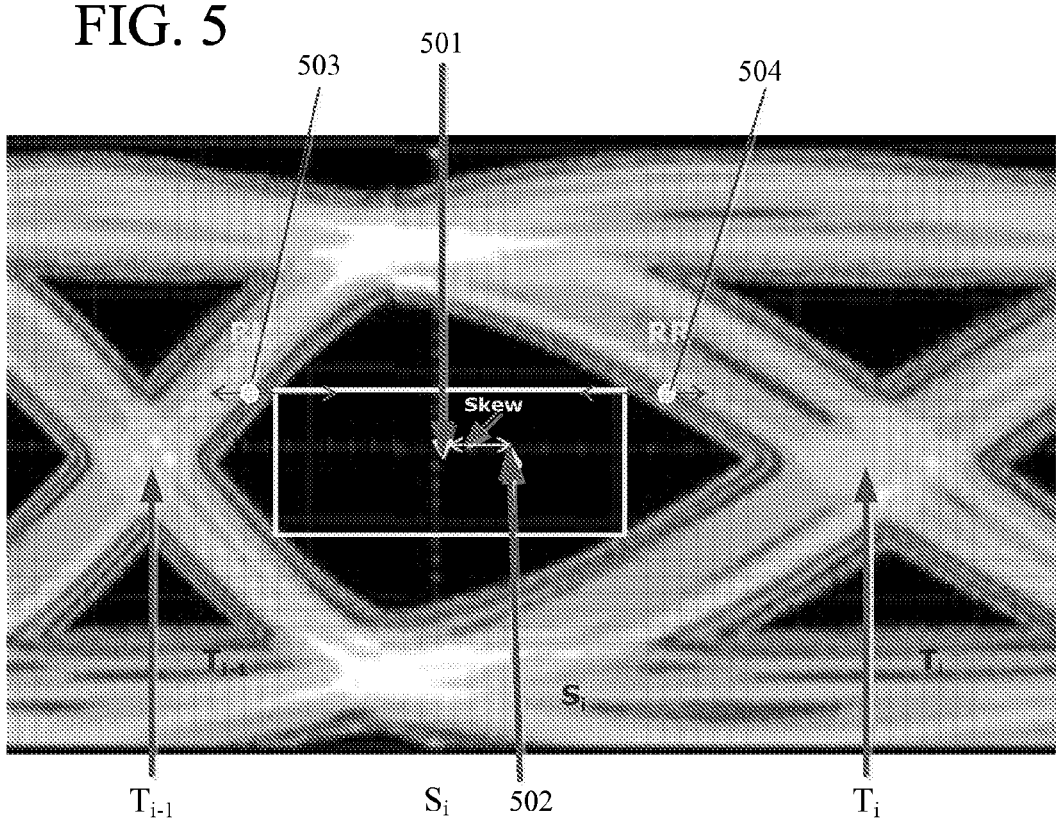
FIG. 5 illustrates IQ-skew of a data eye as might be seen at the output of combiner in FIG. 1 and the data eye rectangle formed for IQ-skew adaptation in accordance with exemplary embodiments.

The IQ-skew adaptation algorithm is now described with respect to FIGS. 3, 4 and 5. The description with respect to FIG. 3 describes a process by which a roaming latch is employed to detect a left inner corner of the data eye. Although not described, the process described with respect to FIG. 3 might be extended and employed to detect four corners of a rectangle formed within the data eye: the left top inner eye corner phase, left bottom inner eye corner phase, right top inner eye phase, and right bottom inner eye corner phase. FIG. 4 describes a process by which the four corners are detected and the center of eye is determined to set the data sampling phase. FIG. 5 illustrates an exemplary data eye, the rectangle formed from the four corners, and a comparison of the eye center before and after IQ-skew adaptation.

FIG. 3 shows a block diagram for data accumulation for the IQ adaptation process for adaptation of the left inner eye corner that might be employed by the CDR 106 of FIG. 1. The first part of the biased BBPD is simply a bank of L phase detectors (shown as PDs 301(1) through 301(L)) that use the current data sample (Vk−j) at instant k, the previous data sample (Vk−j−1) as well as the sample value from a roaming latch (Rk−j) as its inputs, j=0, ..., L−1. The value for L might be programmable; usually set to 2*N, where N is the CDR decimation factor. The BBPD outputs +1 (UPs), −1 (DOWNs) and 0 (indicating neither an UP nor DOWN) are obtained and are summed up (via combiner 302) and stored in an accumulator (as Acc in accumulator 303) in a register clocked at iqsa_update_rate=L*UI, where UI is the unit interval of a data symbol.

At the end of every iqsa_update_rate, if the accumulator sum value Acc>0, its value is added to another register value Acc_up (shown as register 304($a$)); if Acc<0, its value is subtracted from Acc_dn (shown as in register 304($b$)). In order to bias the UPs and DOWNs, two different thresholds, "iqsa_thrs_high" and "iqsa_thrs_low" are employed, wherein iqsa_thrs_high is greater than iqsa_thrs_low. At the end of every L UI period, if Acc_up is greater than or equal to iqsa_thrs_low, the phase interpolator code PI for the roaming latch is incremented by 1 (shown as register 305($a$)), and the value of Acc_up decremented by iqsa_thrs_low. A similar operation is carried out in the case that Acc_dn is larger than iqsa_thrs_high, but with the phase interpolator code PI decremented by 1 (shown as register 304($b$)). The block diagram for data accumulation for the IQ adaptation algorithm for adaptation of the right inner eye corner is similar to that of FIG. 3, so description thereof will be omitted herein, except iqsa_thrs_low and iqsa_thrs_high values/calculations are swapped.

Once the left and right corners of the inner eye are found, the center of the eye (e.g., eye_center) is ideally the mid-point of these two corner points, and the resulting IQ-skew is computed based on how far off the data sampling point is from this mid-point. Given that iqsa_thrs_high is greater than iqsa_thrs_low, when the roaming latch is located near the left eye corner but outside the inner eye, moving right or into the eye is more probable than moving left or away from the eye. Once the roaming latch moves into the inner eye, the BBPD records only −1's and the roaming latch is pushed out of the inner eye, leading to the settling of the roaming latch at the left inner eye corner.

Two characteristics should be noted. First, when iqsa_thrs_low=iqsa_thrs_high, the operation is as a 'classical' bang-bang detector. Moving in or out of the eye is equally probable, and the roaming latch settles to the transition sampling point. Second, since the thresholds iqsa_thrs_high and iqsa_thrs_low determine the settling BER (bit error rate) for the inner eye corner, the IQ-skew adaptation algorithm settles at an inner eye BER ρ, such that ρ=iqsa_thrs_low/(iqsa_thrs_low+iqsa_thrs_high). Thus, when iqsa_thrs_high=iqsa_thrs_low, the BBPD settles at ρ½, which is the transition sampling point. A higher ratio of iqsa_thrs_high/iqsa_thrs_low indicates that the eye corners are found more accurately (due to settling at lower ρ), but might also increase the convergence time for adaptation.

Table 1 provides exemplary values for low and high thresholds iqsa_thrs_low and iqsa_thrs_high, respectively, that might be employed in 8 Gb and 12 Gb applications and 15 iterations of IQ-skew adaptation. Table 2 provides exemplary values for BER with differing low and high thresholds iqsa_thrs_low and iqsa_thrs_high, respectively.

TABLE 1

| iqsa_thrs_low (index) | iqsa_thrs_low (value) | Equivalent Expression | iqsa_thrs_high (index) | iqsa_thrs_high (value) | Equivalent Expression |
|---|---|---|---|---|---|
| 0 | 8 | 23 | 0 | 1024 | $2^{10}$ |
| 1 | 16 | 24 | 1 | 2048 | $2^{11}$ |

TABLE 2

| iqsa_thrs_high | iqsa_thrs_low | BER |
|---|---|---|
| 1024 | 8 | ~1e-2 |
| 8192 | 8 | ~1e-3 |
| 65538 | 8 | ~1e-4 |
| 786432 | 8 | ~1e-5 |

FIG. 4 illustrates a process as might be employed by a state machine implementing an exemplary IQ-skew adaptation algorithm. At step 401, Timer 1 is set to iqsa_start and a test determines if Timer 1 is expired (yes). Timer 1 might be implemented as a programmable counter and determines the start time of the IQ-skew adaptation algorithm. In general, the start time depends on when the other adaptation loops (such as AFE (analog front end equalization), CDR, and DFE) have converged, and for an exemplary embodiment takes the following values specified in Table 3.

TABLE 3

| iqsa_start_timer | Start time (UI) |
|---|---|
| 0 | 65536 |
| 1 | 131072 |
| 2 | 262144 |
| 3 | 524288 |

At step 402, the IQ skew adaptation is started. At step 403, 1) the vertical roaming latch offset is set to V (e.g., iqskew_n_roamoff=V), where V is employed to set a vertical latch position within the eye; and 2) horizontal roaming latch is set to the left transition point (e.g., rskew=iskew-32).

At step 404, Timer 2 is set to a predetermined value (Timer 2 might also be a programmable counter) and a test determines if Timer 2 is expired (yes). Timer 2 is set to the worst-case time required for the roaming latch to converge to each of the rectangle corners. Once the IQ-skew adaptation algorithm is enabled at step 402, the process allows the roaming latch to settle to the four corners of the rectangle—left top, left bottom, right top and right bottom of the eye, in that particular order for the exemplary embodiment described herein. To this end the roaming latch is initialized at coordinates for locations near the corners of the eye and then allowed to converge. At step 404, Timer 2 is employed to allow the roaming latch to settle at the left top corner of the eye. At step 405, 1) roaming latch settling phase (iqsa_rl_left_top) is recorded; and 2) the vertical roaming latch offset is set to −V.

At step 406, Timer 2 is again set to a predetermined value and a test determines if Timer 2 is expired (yes). At step 406, Timer 2 is employed to allow the roaming latch to settle at the left bottom corner of the eye. At step 407, 1) roaming latch settling phase (iqsa_rl_left_bottom) is recorded; 2) the vertical roaming latch offset is set to V (e.g., iqskew_n_roamoff=V); and the horizontal roaming latch is set to the right transition sampling point (e.g., rskew=iskew+32).

At step 408, Timer 2 is again set to a predetermined value and a test determines if Timer 2 is expired (yes). At step 408, Timer 2 is employed to allow the roaming latch to settle at the right top corner of the eye. At step 409, 1) roaming latch settling phase (iqsa_d_right_top) is recorded; and 2) the vertical roaming latch offset is set to −V.

At step 410, Timer 2 is again set to a predetermined value and a test determines if Timer 2 is expired (yes). At step 410, Timer 2 is employed to allow the roaming latch to settle at the right bottom corner of the eye. At step 411, roaming latch settling phase (iqsa_rl_right_bottom) is recorded.

At step 412, the center of the rectangle formed by the four recorded corner phases (iqsa_rl_left_top, iqsa_d_left_bottom, iqsa_rl_right_top, and iqsa_rl_right_bottom) is determined. With the center of the data eye determined, the data sampling phase is shifted to the desired sampling phase, wherein the shift iq_skew being the appropriate IQ-skew value. Given the settling roaming latch phases as iqsa_rl_phaseleft_top, iqsa_d_phaseleft_bottom, iqsa_rl_phase_right_top and iqsa_rl_phase_right_bottom, the inner eye center is calculated as in relation (1):

$$\text{eye\_center}=\tfrac{1}{2}[(\text{iqsa\_rl\_left\_top}+\text{iqsa\_rl\_left\_bottom})/2+\text{iqsa\_rl\_right\_top}+\text{iqsa\_rl\_right\_bottom})/2] \quad (1)$$

The resulting iq-skew value with respect to the value of iskew may be computed as iq_skew=[⌊eye_center⌋-iskew]* (1/32) for an exemplary embodiment, where the floor operator "⌊ ⌋" is used so that the value of eye_center (the desired data sampling phase) is an integer. Rather than moving the data sample latch, an iq_skew value equal to the negative of the aforementioned value is applied to the transition latch. In the previous relation (1), depending on how far off iskew is from the eye_center, the value of iq_skew might jump by much more than a phase code of 1/32. However, since 1/32=0.03125 UI, which is a significant value, the iq_skew phase code jump might be restricted to at most 1 code unit in each iteration. Even though this results in a larger iq_skew convergence time due to the slow jumps, doing so might results in a more robust iq_skew setting.

At step 413, Timer 3 is set to a value (Timer 2 might also be a programmable counter) and a test determines if Timer 3 is expired (yes). Timer 3 is set, for example, to iqsa_idle_timer and is used at the end of every IQ-skew adaptation iteration to let other adaptation loops (e.g., AFE, CDR and DFE) re-converge. During this period of time, the roaming latch is not used. At the expiration of this timer, another iteration of the IQ-skew adaptation routine begins by returning to step 403.

FIG. 5 illustrates IQ-skew of a data eye as might be seen at the output of combiner in FIG. 1 and the data eye rectangle formed for IQ-skew adaptation in accordance with exemplary embodiments. As shown, separation between the data sampling phase (I) and the transition sampling phase (Q) is different from the value required for eye centering. Without IQ-skew adaptation, the data sampling phase is set at point 502, but the center of the eye is at point 501. As shown in FIG. 5, rather just using the left and right inner eye corners for computing the IQ-skew, roaming latches RL (left side of eye) 503 and RR (right side of eye) 504 settle to four corners of a rectangle inside the inner eye to obtain more robust adaptation results. The vertical offset for this rectangle accounts for latch offset and sensitivity.

Embodiments of the present invention might provide for the following advantages. Rather than manually programming IQ-skew, an adaptation algorithm automatically adjusts for IQ-skew. A SerDes receiver using an exemplary embodiment allows for sampling of the DFE output inner eye that is nearly fully centered. Centering the DFE output inner eye leads to an improved horizontal margin and improved BER performance. Embodiments might track process, voltage and temperature (PVT) variations, and also track channel characteristic and loss variations. Convergence of the algorithms presented herein might be relatively fast, and also exhibit relatively low implementation cost when implemented as a digital state machine and secondary CDR.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Further, the term "comprises or includes" and/or "comprising or including" used in the document means that one or more other components, steps, operation and/or existence or addition of elements are not excluded in addition to the described components, steps, operation and/or elements.

Signals and corresponding nodes or ports may be referred to by the same name and are interchangeable for purposes here.

No claim element herein is to be construed under the provisions of 35 U.S.C. §112, sixth paragraph, unless the element is expressly recited using the phrase "means for" or "step for."

It is understood that various changes in the details, materials, and arrangements of the parts which have been described and illustrated in order to explain the nature of this invention may be made by those skilled in the art without departing from the scope of the embodiments of the invention as encompassed in the following claims.

We claim:

1. A method of generating a skew offset in a clock and data recovery (CDR) device, the method comprising:
    generating a data eye from an input signal to a decision device, the input signal including a sequence of data symbols;
    performing phase detection for each corner of a rectangle framing a center of the data eye by:
        initializing a roaming latch to the corner of the data eye,
        allowing the roaming latch to settle to a phase of the corner,
        recording horizontal positions of the settled phase,
        applying samples of the corner to a bank of L phase detectors, L being an integer greater than or equal to 1,
        accumulating the outputs of the L phase detectors, each output representing a corresponding up or down value, to generate an accumulated up or an accumulated down value,
        weighting the accumulated up or the accumulated down value, and
        detecting a phase of the corner when the weighed accumulated up value and the weighted accumulate down value reach an equilibrium state;
    determining a phase position of a center of the rectangle, wherein the center phase position represents a vertical and horizontal phase position of the center of the data eye;
    detecting a difference between the center phase position and a current data sampling phase position, the detected difference between the center phase position and the current data sampling phase position being related to the skew offset; and
    adjusting the current data sampling phase position based on the skew offset.

2. The method of claim 1, wherein the weighting the accumulated up or the accumulated down value comprises comparing the accumulated up or the accumulated down value to a corresponding threshold.

3. The method of claim 2, comprising setting each threshold so the roaming latch settles to a settled phase of the corner from a direction toward the center of the data eye.

4. The method of claim 1, comprising repeating the method to adaptively set the current data sampling phase position at the center of the data eye.

5. The method of claim 1, wherein the method is applied separately to even symbols and to odd data symbols.

6. The method of claim 1, wherein the method is embodied in a Serializer/Deserializer (Ser Des) device.

7. Apparatus for generating a skew offset in a clock and data recovery (CDR) device, the apparatus comprising:
    a decision device configured to generate a data eye from an input signal to the decision device, the input signal including a sequence of data symbols;
    a phase detector configured to perform phase detection for each corner of a rectangle framing a center of the data eye, the phase detector comprising:
        a bank of L phase detectors, L being an integer greater than or equal to 1, wherein the samples of the corner are applied to the bank of L phase detectors;
        an accumulator configured to accumulate the outputs of the L phase detectors, each output representing a corresponding up or down value, and configured to generate an accumulated up or an accumulated down value; and
        a combiner configured to apply weights to the accumulated up or the accumulated down value;
    wherein the phase detector is configured to:
        detect a phase of the corner when the weighted accumulated up value and the weighted accumulate down value reach an equilibrium state,
        initialize a roaming latch to the corner of the data eye,
        allow the roaming latch to settle to a phase of the corner, and
        record horizontal positions of the settled phase; and
    a controller configured to determine a phase position of a center of the rectangle, wherein the center phase position represents a vertical and horizontal phase position of the center of the data eye,
    wherein the controller is configured to detect a difference between the center phase position and a current data sampling phase position, the detected difference between the center phase position and the current data sampling phase position being related to the skew offset; and
    adjust the current data sampling phase position based on the skew offset.

8. The apparatus of claim 7, wherein the combiner applies weights to the accumulated up or the accumulated down value with a comparator configured to compare the accumulated up or the accumulated down value to a corresponding threshold.

9. The apparatus of claim 8, wherein the phase detector sets each threshold so the roaming latch settles to a settled phase of the corner from a direction toward the center of the data eye.

10. The apparatus of claim 7, wherein the apparatus is configured to adaptively set the data sampling phase position at the center of the eye.

11. The method of claim 7, wherein the apparatus is configured to separately adjust the current data sampling phase for even symbols and for odd data symbols.

12. The apparatus of claim 7, wherein the apparatus is embodied in a Serializer/Deserializer (SerDes) device.

13. The apparatus of claim 7, wherein the apparatus is embodied in an integrated circuit.

14. A non-transitory machine-readable storage medium, having encoded thereon program code, wherein, when the program code is executed by a machine, the machine implements a method for generating a skew offset in a clock and data recovery (CDR) device, comprising the steps of:
    generating a data eye from an input signal to the decision device, the input signal including a sequence of data symbols;

performing phase detection for each corner of a rectangle framing a center of the data eye by:
  initializing a roaming latch to the corner of the data eye, allowing the roaming latch to settle to a phase of the corner,
  recording horizontal positions of the settled phase,
  applying samples of the corner to a bank of L phase detectors, L being an integer greater than or equal to 1,
  accumulating the outputs of the L phase detectors, each output representing a corresponding up or down value, to generate an accumulated up or an accumulated down value,
  weighting the accumulated up or the accumulated down value, and
  detecting a phase of the corner when the weighted accumulated up value and the weighted accumulate down value reach an equilibrium state;
determining a phase position of a center of the rectangle, wherein the center phase position represents a vertical and horizontal phase position of the center of the data eye;
detecting a difference between the center phase position and a current data sampling phase position, the detected difference between the center phase position and the current data sampling phase position being related to the skew offset; and adjusting the current data sampling phase position based on the skew offset.

15. The non-transitory machine-readable storage medium of claim 14, wherein the weighting the accumulated up or the accumulated down value comprises comparing the accumulated up or the accumulated down value to a corresponding threshold.

16. The non-transitory machine-readable storage medium of claim 15, comprising setting each threshold so the roaming latch settles to a settled phase of the corner from a direction toward the center of the data eye.

17. The non-transitory machine-readable storage medium of claim 14, comprising repeating the method to adaptively set the current data sampling phase position at the center of the data eye.

18. The method of claim 1, wherein the input signal is received on a communication channel as a serialized input.

19. The apparatus of claim 7, wherein the input signal is received on a communication channel as a serialized input.

20. The non-transitory machine-readable storage medium of claim 14, wherein the input signal is received on a communication channel as a serialized input.

* * * * *